United States Patent
Yao

(10) Patent No.: US 7,394,566 B2
(45) Date of Patent: *Jul. 1, 2008

(54) CALIBRATION OF COLOR DEVICES

(75) Inventor: Meng Yao, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 822 days.

This patent is subject to a terminal disclaimer.

(21) Appl. No.: 10/945,600

(22) Filed: Sep. 20, 2004

(65) Prior Publication Data

US 2006/0061782 A1    Mar. 23, 2006

(51) Int. Cl.
*G06F 15/00* (2006.01)
(52) U.S. Cl. .................. 358/1.9; 358/504; 358/518; 358/525; 358/529
(58) Field of Classification Search ............... 358/1.9, 358/504, 518, 525, 529
See application file for complete search history.

(56) References Cited

U.S. PATENT DOCUMENTS

2004/0070776 A1   4/2004  Yao et al.
2004/0114164 A1   6/2004  Linder et al.

*Primary Examiner*—Twyler L. Haskins
*Assistant Examiner*—Michael Burleson
(74) *Attorney, Agent, or Firm*—Fay Sharpe LLP

(57) ABSTRACT

A method of adjusting a non-black primary color value including determining first, second and third portions of the non-black primary color value; determining a first contribution using a first one-dimensional look-up table and the first portion, wherein the primary color value is used as an index to the first one-dimensional look-up table; determining a second contribution using a second one-dimensional look-up table and the second portion, wherein the primary color value is used as an index to the second one-dimensional look-up table; determining a third contribution using a third one-dimensional look-up table and the third portion, wherein the primary color value is used as an index to the third one-dimensional look-up table; and summing the first, second and third contributions.

9 Claims, 3 Drawing Sheets

$Cadj = C2 * c'\_tbl[C] + green * green'\_C[C] + blue*blue'\_C[C] + GRAY * graybal'\_C[C]$ $Madj = M2 * m'\_tbl[M] + red * red'\_M[M] + blue*blue'\_M[M] + GRAY * graybal'\_M[M]$ $Yadj = Y2 * y'\_tbl[Y] + red * red'\_Y[Y] + green * green'\_Y[Y] + GRAY * graybal'\_Y[Y]$

CALIBRATION OF COLOR DEVICES

BACKGROUND

The subject disclosure is generally directed to color printing.

Color printers typically employ a plurality of inks of different primary colors to generate a spectrum of colors. For example, many color printers use four ink colors: cyan (C), magenta (M), yellow (Y) and black (K). Color images are formed on a receiving substrate or medium by placing combinations of zero or more dots of C, M, Y or K ink at each pixel location. Cyan, magenta and yellow are typically employed since a wide range of colors can be produced by different combinations of these inks.

It can be difficult to calibrate color printers.

BRIEF DESCRIPTION OF DRAWINGS

FIG. 4 is an embodiment of alternative calculations that can be employed in the procedure of FIG. 3.

DETAILED DESCRIPTION

Figure 1:
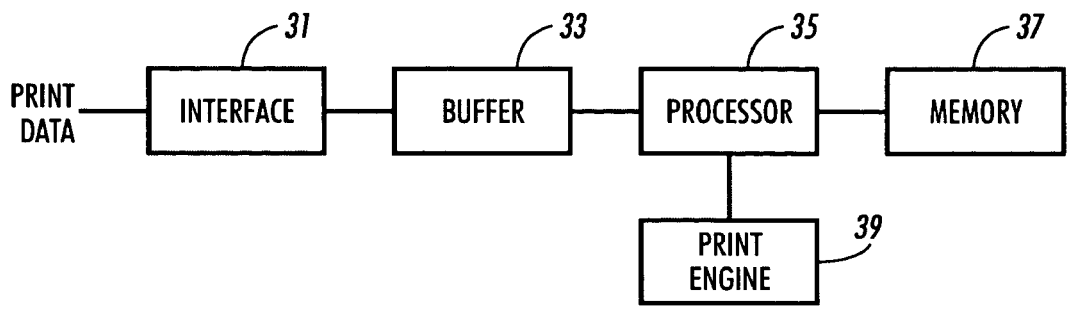
FIG. 1 is a schematic block diagram of an embodiment of a printing system.

FIG. 1 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit map raster data generated by the processor 35. The print engine 39 can be an electrophotographic print engine or an ink jet print engine, for example.

Figure 2:
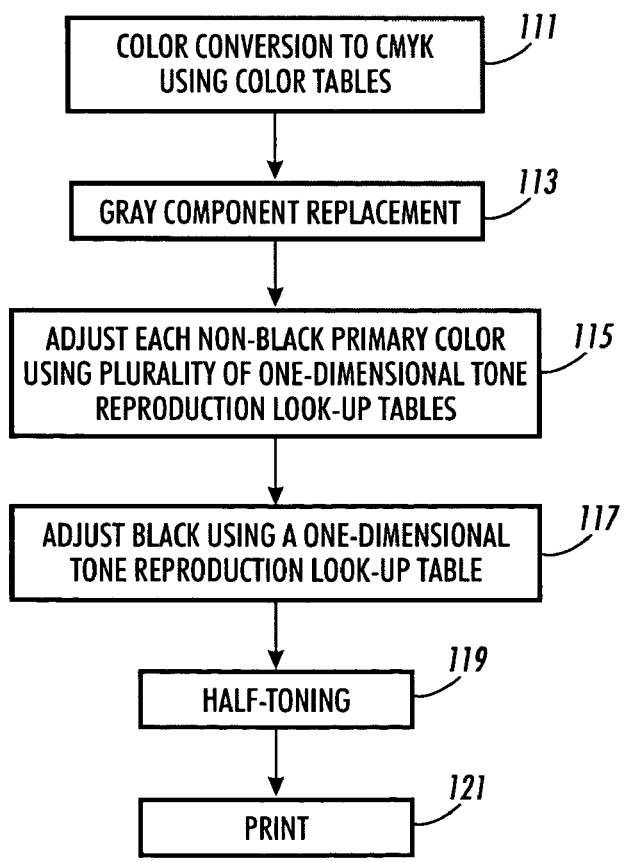
FIG. 2 is a schematic diagram of an embodiment of an image processing pipeline.

FIG. 2 is a block diagram of an embodiment of a portion of an image processing pipeline for a color printer. At 111 input color data is transformed to printer color space such as CMYK which employs the primary colors of cyan, magenta, yellow and black, for example using color tables. At 113 gray component replacement is performed on printer primary color data, wherein some amounts of the non-black primary colors are replaced with black. At 115 each non-black primary color is adjusted using a plurality of one-dimensional tone reproduction curves (TRCs), as disclosed more particularly herein. At 117 black is adjusted (e.g., linearized) using a one-dimensional TRC. At 119 half-toning is performed, and at 121 printing takes place. In practice, the step 113 of gray component replacement can be merged into the step 111 of color data transformation by applying gray component replacement to each entry in color tables employed in the color data transformation. Additionally, the step 115 of adjusting each non-black primary color value using a plurality of one-dimensional TRCs and the step 117 of adjusting black using a one-dimensional TRC can also be merged into the step 111 of color data transformation by further adjusting each gray component replacement adjusted entry in the color tables. The one-dimensional TRCs employed in the disclosed embodiments can be implemented as one-dimensional look-up tables, for example.

The adjustments at 115 and 117 can be employed to calibrate the printing apparatus, for example. For ease of reference, the embodiments disclosed herein employ C, M, Y, K primary colors.

Figure 3:
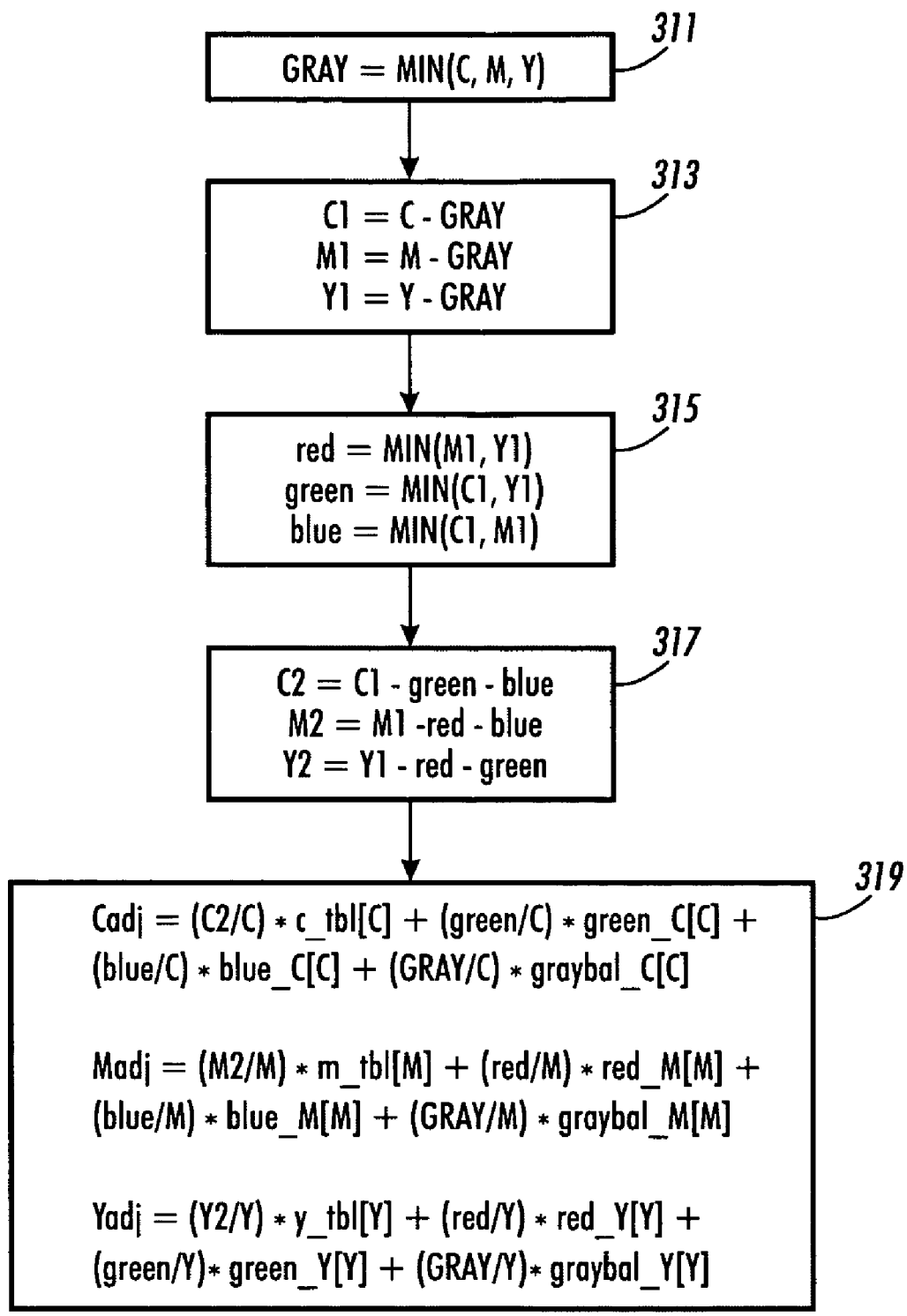
FIG. 3 is a schematic flow diagram of an embodiment of a procedure for adjusting non-black primary colors using a plurality of one-dimensional look-up tables for each non-black primary color.

FIG. 3 is a schematic flow diagram of an embodiment of a procedure that can be employed at 115 (FIG. 2) for adjusting non-black primary color values, such as CMY, using a plurality of one-dimensional TRCs for each non-black primary color.

At 311 a GRAY component is set to the minimum of the original or input non-black primary colors C, M, Y values. As to each of such C, M, Y values, GRAY comprises the amount of a non-black primary color that contributes to the gray of the particular C, M, Y data and can be called a gray component of a non-black primary color.

At 313 the GRAY component is subtracted from each of the non-black primary color inputs C, M, Y to arrive at versions C1, M1, Y1 of the non-black primary colors from which the GRAY component has been removed.

At 315 the secondary colors red, green and blue are set to the minimums of the appropriate combinations (M1, Y1), (C1, Y1), (C1, M1) of the non-black primary color values from which the GRAY component has been removed. As to each of the C, M, Y values, green comprises the amounts of cyan and yellow that contribute to the green secondary color of the particular C, M, Y data, blue comprises the amounts of cyan and magenta that contribute to the blue secondary color of the particular C, M, Y data, and red comprises the amounts of magenta and yellow that contribute to the red secondary color of the particular C, M, Y data. It should be appreciated that in this example there is at most one non-zero secondary color for any set of C, M, Y values, since at least one of C1, M1, Y1 as calculated at 313 is zero. The portion of a non-black primary color value that contributes to a secondary color can be conveniently called a secondary color component of the non-black primary color value (e.g., the green component of the cyan color value, the blue component of the cyan color value, etc.). For ease of reference, a secondary color component of a primary color value can sometimes be called a secondary component of a primary color (e.g., the blue component of magenta, the red component of magenta, etc.).

At 317 a primary component of each of the non-black primary color values is obtained by subtracting appropriate secondary color components from the non-black primary color values from which the GRAY component has been removed. In particular, green and blue are removed from C1 to obtain a primary component C2 of the cyan color value C, red and blue are removed from M1 to obtain a primary component M2 of the magenta color value M, and red and green are removed from Y1 to obtain a primary component Y2 of the yellow color value Y. While the C, M, Y values form at most one secondary color in this example, the equations at 317 are generalized to include the three possible secondary colors.

At 319 or 319 A (FIG. 4) respective adjusted non-black primary color values are obtained by summing for each non-black primary color a respective contribution of a gray balancing related primary color TRC for balancing gray (which can be called a gray balancing contribution), a respective contribution of a secondary color related primary color TRC (which can be called a secondary color contribution), and a respective contribution of a primary component related primary color TRC (which can be called a primary contribution), wherein the index to each of the TRCs comprises the original primary color value.

In particular as to cyan, at 319 an adjusted cyan color value Cadj can be obtained by:

$$Cadj = (C2/C) * c\_tbl[C] + (green/C) * green\_C[C] +$$
$$(blue/C) * blue\_C[C] + (GRAY/C) * graybal\_C[C]$$

wherein (C2/C) comprises the fractional portion or relative amount of the cyan color value C that comprises the primary component of the cyan color value C, c_tbl[ ] comprises a one-dimensional primary component related cyan TRC for adjusting (e.g., linearizing) cyan, (green/C) comprises the fractional portion or relative amount of the cyan color value C that comprises the green component of the cyan color value C, green_C[ ] comprises a one-dimensional green related cyan TRC, (blue/C) comprises the fractional portion or relative amount of the cyan color value C that comprises the blue component of the cyan color value C, blue_C[ ] comprises a one-dimensional blue related cyan TRC, (GRAY/C) comprises the fractional portion or relative amount of the cyan color value C that comprises the gray component of the cyan color value C, and graybal_C[ ] is a one-dimensional gray balancing related cyan TRC for balancing gray.

In this manner, (C2/C)*c_tbl[C] comprises a contribution of a primary component related cyan TRC for adjusting cyan, wherein the primary component related cyan TRC value c_tbl[C] as indexed by the cyan color value C is scaled or weighted by the relative amount of the cyan color value C that comprises the primary component of the cyan color value C. (green/C)*green_C[C] comprises a contribution of a green related cyan TRC, wherein the green related cyan TRC value green_C[C] as indexed by the cyan color value C is scaled or weighted by the relative amount of the cyan color value C that comprises the green component of the cyan color value C. (blue/C)*blue_C[C] comprises a contribution of a blue related cyan TRC, wherein the blue related cyan TRC value blue_C[C] as indexed by the cyan color value C is scaled or weighted by the relative amount of the cyan color value C that comprises the blue component of the cyan color value C. (GRAY/C)*graybal_C[C] comprises a contribution of a gray balancing related cyan TRC for balancing gray, wherein the gray balancing related cyan TRC value graybal_C[C] is scaled or weighted by the relative amount of the cyan color value C that comprises the gray component of the cyan color value C.

The first equation at 319 can be rewritten as follows:

$$Cadj = C2 * c\_tbl[C]/C + green * green\_C[C]/C +$$
$$blue * blue\_C[C]/C + GRAY * graybal\_C[C]/C$$

This shows that in calculating an adjusted cyan value the division by C can be performed on each of the one-dimensional TRC values. Accordingly, at 319A normalized TRCs c'_tbl[ ], green'_C[ ], blue'_C[ ] and graybal'_C[ ] (wherein c'_tbl[C]=c_tbl[C]/C, green'_C[C]=green_C[C]/C, blue'_C[C]=blue_C[C]/C and graybal'_C[C]=graybal_C[C]/C) can be employed to obtain an adjusted cyan color value Cadj:

$$Cadj = C2 * c'\_tbl[C] + green * green'\_C[C] +$$
$$blue * blue\_C[C] + GRAY * graybal'\_C[C]$$

wherein C2 comprises the amount or portion of the cyan color value C that comprises the primary component of cyan, c'_tbl[ ] comprises a normalized one-dimensional primary component related cyan TRC for adjusting (e.g., linearizing) cyan, green comprises the green component of the cyan color value C, green'_C[ ] comprises a normalized one-dimensional green related cyan TRC, blue comprises the blue component of the cyan color value C, blue'_C[ ] comprises a normalized one-dimensional blue related cyan TRC, GRAY comprises the gray component of the cyan color value C, and graybal'_C[ ] is a normalized one-dimensional gray balancing related cyan TRC for balancing gray.

In this manner, C2*c'_tbl[C] comprises a contribution of a normalized primary component related cyan TRC for adjusting (e.g., linearizing) cyan, wherein the normalized primary component related cyan TRC value c'_tbl[C] as indexed by the cyan color value C is scaled or weighted by the amount of the cyan color value C that comprises the primary component of the cyan color value C. (green)*green'_C[C] comprises a contribution of a normalized green related cyan TRC, wherein the normalized green related cyan TRC value green'_C[C] as indexed by the cyan color value C is scaled or weighted by the amount of the cyan color value C that comprises the green component of the cyan color value C. (blue)*blue'_C[C] comprises a contribution of a normalized blue related cyan TRC, wherein the normalized blue related cyan TRC value blue'_C[C] as indexed by the cyan color value C is scaled or weighted by the amount of the cyan color value that comprises the blue component of the cyan color value C. (GRAY)*graybal'_C[C] comprises a contribution of a normalized gray balancing related cyan TRC, wherein the normalized gray balancing related cyan TRC value graybal'_C[C] is scaled or weighted by the amount of the cyan color value that comprises the gray component of the cyan color value C.

In particular as to magenta, at 319 an adjusted magenta color value Madj can be obtained by:

$$Madj = (M2/M) * m\_tbl[M] + (red/M * red\_M[M] +$$
$$(blue/M) * blue\_M[M] + (GRAY/M) * graybal\_M[M]$$

wherein (M2/M) comprises the fractional portion or relative amount of the magenta color value M that comprises the primary component of the magenta color value M, m_tbl[ ] comprises a one-dimensional primary component related magenta TRC for adjusting (e.g., linearizing) magenta, (red/M) comprises the fractional portion or relative amount of the magenta color value M that comprises the red component of the magenta color value M, red_M[ ] comprises a one-dimensional red related magenta TRC, (blue/M) comprises the fractional portion or relative amount of the magenta color value M that comprises the blue component of the magenta color value M, blue_M[ ] comprises a one-dimensional blue related magenta TRC, (GRAY/M) comprises the fractional portion or relative amount of the magenta color value M that comprises the gray component of the magenta color value M, and graybal_M[ ] is a one-dimensional gray balancing related magenta TRC for balancing gray.

In this manner, (M2/M)*m_tbl[M] comprises a contribution of a primary component related magenta TRC for adjusting magenta, wherein the primary component related magenta TRC value m_tbl[M] as indexed by the magenta color value M is scaled or weighted by the relative amount of the magenta color value M that comprises the primary component of the magenta color value M. (red/M)*red_M[M] comprises a contribution of a red related magenta TRC, wherein the red related magenta TRC value red_M[M] as indexed by the magenta color value M is scaled or weighted by the relative amount of the magenta color value M that comprises the red component of the magenta color value M. (blue/M)*blue_M[M] comprises a contribution of a blue related magenta TRC, wherein the blue related magenta TRC value blue_M[M] as indexed by the magenta color value M is scaled or weighted by the relative amount of the magenta color value M that comprises the blue component of the magenta color value M. (GRAY/M)*graybal_M[M] comprises a contribution of a gray balancing related magenta TRC for balancing gray, wherein the gray balancing related magenta TRC value graybal_M[M] is scaled or weighted by the relative amount of the magenta color value M that comprises the gray component of the magenta color value M.

The second equation at 319 can be rewritten as follows:

$$Madj = M2*m\_tbl[M]/M + red*red\_M[M]/M + blue*blue\_M[M]/M + GRAY*graybal\_M[M]/M$$

This shows that in calculating an adjusted magenta value the division by M can be performed on each of the one-dimensional TRC values. Accordingly, at 319A normalized TRCs m'_tbl[ ], red'_M[ ], blue'_M[ ] and graybal'_M[ ] (wherein m'_tbl[M]=m_tbl[M]/M, red'_M[M]=red_M[M]/M, blue'$_{M[M]=blue}$_M[M]/M and graybal'_M[M]=graybal_M[M]/M) can be employed to obtain an adjusted magenta color value Madj:

$$Madj = M2*m'\_tbl[M] + red*red'\_M[M] + blue*blue'\_M[M] + GRAY*graybal'\_M[M]$$

wherein M2 comprises the amount or portion of the magenta color value M that comprises the primary component of magenta, m'_tbl[ ] comprises a normalized one-dimensional primary component related magenta TRC for adjusting (e.g., linearizing) magenta, red comprises the red component of the magenta color value M, red'_M[ ] comprises a normalized one-dimensional red related magenta TRC, blue comprises the blue component of the magenta color value M, blue'_M[ ] comprises a normalized one-dimensional blue related magenta TRC, GRAY comprises the gray component of the magenta color value M, and graybal'_M[ ] is a normalized one-dimensional gray balancing related magenta TRC for balancing gray.

In this manner, M2*m'_tbl[M] comprises a contribution of a normalized primary component related magenta TRC for adjusting (e.g., linearizing) magenta, wherein the normalized primary component related magenta TRC value m'_tbl[M] as indexed by the magenta color value M is scaled or weighted by the amount of the magenta color value M that comprises the primary component of the magenta color value M. (red)*red'_M[M] comprises a contribution of a normalized red related magenta TRC, wherein the normalized red related magenta TRC value red'_M[M] as indexed by the magenta color value M is scaled or weighted by the amount of the magenta color value M that comprises the red component of the magenta color value M. (blue)*blue'_M[M] comprises a contribution of a normalized blue related magenta TRC, wherein the normalized blue related magenta TRC value blue'_M[M] as indexed by the magenta color value M is scaled or weighted by the amount of the magenta color value M that comprises the blue component of the magenta color value M. (GRAY)*graybal'_M[M] comprises a contribution of a normalized gray balancing related magenta TRC, wherein the normalized gray balancing related magenta TRC value graybal'_M[M] is scaled or weighted by the amount of the magenta color value M that comprises the gray component of the magenta color value M.

In particular as to yellow, at 319 an adjusted yellow color value Yadj can be obtained by:

$$Yadj = (Y2/Y)*y\_tbl[Y] + (red/Y)*red\_Y[Y] + (green/Y)*green\_Y[Y] + (GRAY/Y)*graybal\_Y[Y]$$

wherein (Y2/Y) comprises the fractional portion or relative amount of the yellow color value Y that comprises the primary component of the yellow color value Y, y_tbl[ ] comprises a one-dimensional primary component related yellow TRC for adjusting (e.g., linearizing) yellow, (red/Y) comprises the fractional portion or relative amount of the yellow color value Y that comprises the red component of the yellow color value Y, red_Y[ ] comprises a one-dimensional red related yellow TRC, (green/Y) comprises the fractional portion or relative amount of the yellow color value Y that comprises the green component of the yellow color value Y, green_Y[ ] comprises a one-dimensional green related yellow TRC, (GRAY/Y) comprises the fractional portion or relative amount of the yellow color value Y that comprises the gray component of the yellow color value Y, and graybal_Y[ ] is a one-dimensional gray balancing related yellow TRC for balancing gray.

In this manner, (Y2/Y)*y_tbl[Y] comprises a contribution of a primary component related yellow TRC for adjusting yellow, wherein the primary component related yellow TRC value y_tbl[Y] as indexed by the yellow color value Y is scaled or weighted by the relative amount of the yellow color value Y that comprises the primary component of the yellow color value Y. (red/Y)*red_Y[Y] comprises a contribution of a red related yellow TRC, wherein the red related yellow TRC value red_Y[Y] as indexed by the yellow color value Y is scaled or weighted by the relative amount of the yellow color value Y that comprises the red component of the yellow color value Y. (green/Y)*green_Y[Y] comprises a contribution of a green related yellow TRC, wherein the green related yellow TRC value green_Y[Y] as indexed by the yellow color value Y is scaled or weighted by the relative amount of the yellow color value Y that comprises the green component of the yellow color value Y. (GRAY/Y)*graybal_Y[Y] comprises a contribution of a gray balancing related yellow TRC for balancing gray, wherein the gray balancing related yellow TRC value graybal_Y[Y] is scaled or weighted by the relative amount of the yellow color value Y that comprises the gray component of the yellow color value Y.

The third equation at 319 can be rewritten as follows:

$$Yadj = Y2*y\_tbl[Y]/Y + red*red\_Y[Y]/Y + green*green\_Y[Y]/Y + GRAY*graybal\_Y[Y]/Y$$

This shows that in calculating an adjusted yellow value the division by Y can be performed on each of the one-dimensional TRC values. Accordingly, at 319A normalized TRCs y'_tbl[ ], red'_Y[ ], green'_Y[ ] and graybal'_Y[ ] (wherein y'_tbl[Y]=y_tbl[Y]/Y, red'_Y[Y]=red_Y[Y]/Y, green'_Y[Y]= green_Y[Y]/Y and graybal'_Y[Y]=graybal_Y[Y]/Y) can be employed to obtain an adjusted yellow color value Yadj:

$$Yadj = Y2*y'\_tbl[Y] + red*red'\_Y[Y] + green*green'\_Y[Y] + GRAY*graybal'\_Y[Y]$$

wherein Y2 comprises the amount or portion of the yellow color value Y that comprises the primary component of yellow, y'_tbl[ ] comprises a normalized one-dimensional primary component related yellow TRC for adjusting (e.g., linearizing) yellow, red comprises the red component of the yellow color value Y, red'_Y[ ] comprises a normalized one-dimensional red related yellow TRC, green comprises the green component of the yellow color value Y, green'_Y[ ] comprises a normalized one-dimensional green related yellow TRC, GRAY comprises the gray component of the yellow color value Y, and graybal'_Y[ ] is a normalized one-dimensional gray balancing related yellow TRC for balancing gray.

In this manner, Y2*y'_tbl[Y] comprises a contribution of a normalized primary component related yellow TRC for adjusting (e.g., linearizing) yellow, wherein the normalized primary component related yellow TRC value y'_tbl[Y] as indexed by the yellow color value Y is scaled or weighted by the amount of the yellow color value Y that comprises the primary component of the yellow color value Y. (red)*red'_Y[Y] comprises a contribution of a normalized red related yellow TRC, wherein the normalized red related yellow TRC value red'_Y[Y] as indexed by the yellow color value Y is scaled or weighted by the amount of the yellow color value Y that comprises the red component of the yellow color value Y. (green)*green'_Y[Y] comprises a contribution of a normalized green related yellow TRC, wherein the normalized green related yellow TRC value green'_Y[Y] as indexed by the yellow color value Y is scaled or weighted by the amount of the yellow color value Y that comprises the green component of the yellow color value Y. (GRAY)*graybal'_Y[Y] comprises a contribution of a normalized gray balancing related yellow TRC, wherein the normalized gray balancing related yellow TRC value graybal'_Y[Y] is scaled or weighted by the amount of the yellow color value Y that comprises the gray component of the yellow color value Y.

Generally, for each non-black primary color, a gray portion or component, a secondary color portion or component, and a primary portion or component are determined. A non-zero non-black primary color can include one or more of such components. For each non-black primary color, a contribution of a gray balancing related primary color TRC is determined, a contribution of a secondary color related primary color TRC is determined and a contribution of a primary component related primary color TRC is determined, for example using the primary color value as an index into the TRCs and scaling the TRC values by the amount (e.g., relative or absolute, depending upon the values of the TRCs) of the non-black primary color that the particular component comprises. An adjusted non-black primary color value is obtained by combining the contribution of the primary component related primary color TRC, the contribution of the secondary color related primary color TRC and the contribution of the gray balancing related primary color TRC.

The one-dimensional primary component related primary color TRCs that are scaled to provide primary component related primary color TRC contributions can be obtained by printing cyan patches, magenta patches, and yellow patches at different coverages and linearizing them based on L*, ΔE, etc.

The one-dimensional green related cyan and yellow TRCs that are scaled to provide green related cyan and yellow TRC contributions can be obtained by printing green patches at different coverages and linearizing them based on L*, ΔE, etc. This can be done without applying the primary component related one-dimensional TRCs to the cyan and yellow components. Hue adjustment can be incorporated into the green related cyan and/or yellow TRCs to make green more cyan or more yellow, for example depending upon the desired calibration. If no hue adjustments to green are to be made, green_C[ ] and green_Y[ ] can be identical, and green'_C[ ] and green'_Y[ ] can be identical.

The one-dimensional blue related cyan and magenta TRCs and the red related magenta and yellow TRCs can be obtained similarly, for example without applying the one-dimensional primary component related primary color TRCs.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of adjusting a non-black primary color value comprising:
   determining a gray component of the non-black primary color value that contributes to a gray color;
   determining a secondary color component of the non-black primary color value that contributes to a secondary color;
   determining a primary component of the non-black primary color value that does not contribute to the gray color or the secondary color;
   determining a gray balancing contribution using a one-dimensional gray balancing related primary color look-up table and the gray component, wherein the primary color value is used as an index to the one-dimensional gray balancing related primary color look-up table;
   determining a secondary color contribution using a one-dimensional secondary color related primary color look-up table and the secondary color component, wherein the primary color value is used as an index to the one-dimensional secondary color related primary color look-up table;
   determining a primary color contribution using a one-dimensional primary component related primary color look-up table and the primary component, wherein the primary color value is used as an index to the one-dimensional primary component related primary color look-up table; and
   summing the gray contribution, the secondary color contribution and the primary color contribution.

2. The method of claim 1 wherein determining a gray contribution comprises:
obtaining a gray balancing related primary color TRC value from a one-dimensional gray balancing related primary color TRC for balancing gray using the non-black primary color value as an index; and
multiplying the gray balancing related primary color TRC value by a ratio of the gray component to the primary color value.

3. The method of claim 1 wherein determining a gray contribution comprises:
obtaining a normalized gray balancing related primary color TRC value from a normalized one-dimensional gray balancing related primary color TRC for balancing gray using the non-black primary color value as an index; and
multiplying the normalized gray balancing related primary color TRC value by the gray component.

4. The method of claim 1 wherein determining a secondary color contribution component comprises:
obtaining a secondary color related primary color TRC value from a one-dimensional secondary color related primary color TRC using the non-black primary color value as an index; and
multiplying the secondary color related primary color TRC value by a ratio of the secondary color component to the primary color value.

5. The method of claim 1 wherein determining a secondary color contribution component comprises:
obtaining a normalized secondary color related primary color TRC value from a normalized one-dimensional secondary color related primary color TRC using the non-black primary color value as an index; and
multiplying the normalized secondary color related primary color TRC value by the secondary color component.

6. The method of claim 1 wherein determining a primary color contribution comprises:
obtaining a primary component related primary color TRC value from one-dimensional primary component related primary color TRC using the non-black primary color value as an index; and
multiplying the primary component related primary color TRC value by a ratio of the primary component to the primary color value.

7. The method of claim 1 wherein determining a primary color contribution comprises:
obtaining a normalized primary component related primary color TRC value from a normalized one-dimensional primary component related primary color TRC using the non-black primary color value as an index; and
multiplying the normalized primary component related primary color TRC value by the primary component.

8. A method of adjusting a non-black primary color value comprising:
determining first, second and third portions of the non-black primary color value;
determining a first contribution using a first one-dimensional look-up table and the first portion, wherein the primary color value is used as an index to the first one-dimensional look-up table;
determining a second contribution using a second one-dimensional look-up table and the second portion, wherein the primary color value is used as an index to the second one-dimensional look-up table;
determining a third contribution using a third one-dimensional look-up table and the third portion, wherein the primary color value is used as an index to the third one-dimensional look-up table; and
summing the first, second and third contributions.

9. A method of adjusting each of a plurality of associated non-black primary color values comprising:
determining for each non-black primary color value a respective gray component that contributes to a gray color, a respective secondary color component that contributes to a secondary color, and a respective primary component that does not contribute to the gray color or the secondary color;
determining for each non-black primary color a respective gray contribution using a respective gray balancing related one-dimensional look-up table and the respective gray component, wherein the respective non-black primary color value is used as an index to the respective gray balancing related one-dimensional look-up table;
determining for each non-black primary color a respective secondary color contribution using a respective one-dimensional secondary color related look-up table and the respective secondary color component, wherein the respective non-black primary color value is used as an index to the respective one-dimensional secondary color related look-up table;
determining for each non-black primary color a respective primary color contribution using a respective one-dimensional primary component related look-up table and the primary component, wherein the respective non-black primary color value is used as an index to the respective one-dimensional primary component related look-up table; and
summing the respective gray contribution, secondary color contribution, and primary contribution for each non-black primary color to obtain adjusted non-black primary color values.

* * * * *